US011065772B2

(12) United States Patent
Becciani et al.

(10) Patent No.: US 11,065,772 B2
(45) Date of Patent: Jul. 20, 2021

(54) FUNCTIONAL ASSEMBLY FOR AN INDUSTRIAL MACHINE, IN PARTICULAR FOR A ROBOT, INCLUDING AN OPERATIVE UNIT EQUIPPED WITH A SAFETY COVER

(71) Applicant: Comau S.p.A., Grugliasco (IT)

(72) Inventors: Giorgio Becciani, Grugliasco (IT);
Giovanni Di Stefano, Grugliasco (IT);
Stefano Arduino, Grugliasco (IT)

(73) Assignee: Coman S.p.A., Grugliasco (IT)

( * ) Notice: Subject to any disclaimer, the term of this patent is extended or adjusted under 35 U.S.C. 154(b) by 318 days.

(21) Appl. No.: 16/007,166

(22) Filed: Jun. 13, 2018

(65) Prior Publication Data
US 2018/0370047 A1    Dec. 27, 2018

(30) Foreign Application Priority Data
Jun. 23, 2017   (EP) .................................. EP17177677

(51) Int. Cl.
*B25J 19/06*  (2006.01)
*B25J 15/00*  (2006.01)
(Continued)

(52) U.S. Cl.
CPC .............. *B25J 19/06* (2013.01); *B25J 13/084* (2013.01); *B25J 13/086* (2013.01); *B25J 15/00* (2013.01); *B25J 19/0075* (2013.01); *B25J 19/02* (2013.01)

(58) Field of Classification Search
CPC ........ B25J 19/02; B25J 19/06; B25J 19/0075; B25J 15/00; B25J 13/086; B25J 13/084
See application file for complete search history.

(56) References Cited

U.S. PATENT DOCUMENTS 8,315,735 B2 * 11/2012 Nihei ..................... B25J 9/1676
                                                                    700/245
9,475,200 B2 * 10/2016 Schlaich ................ B25J 9/1674
(Continued)

FOREIGN PATENT DOCUMENTS

DE    102012217764 A1    6/2014
DE    202013105501 U1    3/2015
(Continued)

OTHER PUBLICATIONS

Peter Heiligensetzer; "Betriebs-und Montageanleitung_KR_5_S1_ 2.x_V KR_C4" Nov. 12, 2013 (Nov. 12, 2013) XPO55340430. Retrieved from the Internet: URL:no url, manufacture documentation [retrieved on Jul. 30, 2017] *p. 9-12, 51-61*.
(Continued)

*Primary Examiner* — Saul Rodriguez
*Assistant Examiner* — Ashley K Romano
(74) *Attorney, Agent, or Firm* — Young Basile Hanlon & MacFarlane, P.C.

(57) ABSTRACT

A functional assembly for an industrial robot includes a safety cover which selectively covers an operative unit or robot end effector. The cover includes a fixed portion and a movable portion which selectively moves relative to the fixed portion. The movable portion selectively moves to cover or uncover a portion of the operative unit for the operative unit to function for its intended purpose. The operative unit can move in two directions orthogonal to the movement of the cover movable portion allowing the operative unit to travel or reach to the full footprint of the cover. The safety cover may include sensors to detect objects in close proximity to the safety cover to slow or stop the robot or functional assembly.

20 Claims, 12 Drawing Sheets

(51) Int. Cl.
 *B25J 13/08* (2006.01)
 *B25J 19/02* (2006.01)
 *B25J 19/00* (2006.01)

(56) References Cited

U.S. PATENT DOCUMENTS

| | | | |
|---|---|---|---|
| 9,605,952 B2* | 3/2017 | Rose | B25J 9/1612 |
| 9,737,991 B2* | 8/2017 | Takahashi | B25J 9/1664 |
| 10,245,729 B2* | 4/2019 | Bordegnoni | B25J 13/086 |
| 10,556,353 B2* | 2/2020 | Su | B25J 9/1638 |
| 10,718,359 B2* | 7/2020 | Rose | B25J 9/146 |
| 2003/0137219 A1 | 7/2003 | Heiligensetzer et al. | |
| 2005/0187657 A1* | 8/2005 | Hashimoto | B25J 19/00 |
| | | | 700/245 |
| 2011/0307097 A1 | 12/2011 | Colledani et al. | |
| 2015/0352720 A1* | 12/2015 | Iizuka | B25J 9/1664 |
| | | | 700/245 |

FOREIGN PATENT DOCUMENTS

| | | |
|---|---|---|
| EP | 3246137 A1 | 11/2017 |
| JP | S63238502 A | 10/1988 |
| JP | 2010010116 A | 1/2010 |
| WO | 2017/036732 A1 | 3/2017 |
| WO | 2017036690 A1 | 3/2017 |
| WO | 2017158120 A1 | 9/2017 |

OTHER PUBLICATIONS

Barbara Asseburg; "Kollisionkraftmidernde Schaumabdeckung für Industrieroboter". Jan. 1, 2005 (Jan. 1, 2005), p. 2, XP055341305; Retrieved from the Internet: URL:no url, manufacture documentation [retrieved on Feb. 1, 2017].

* cited by examiner

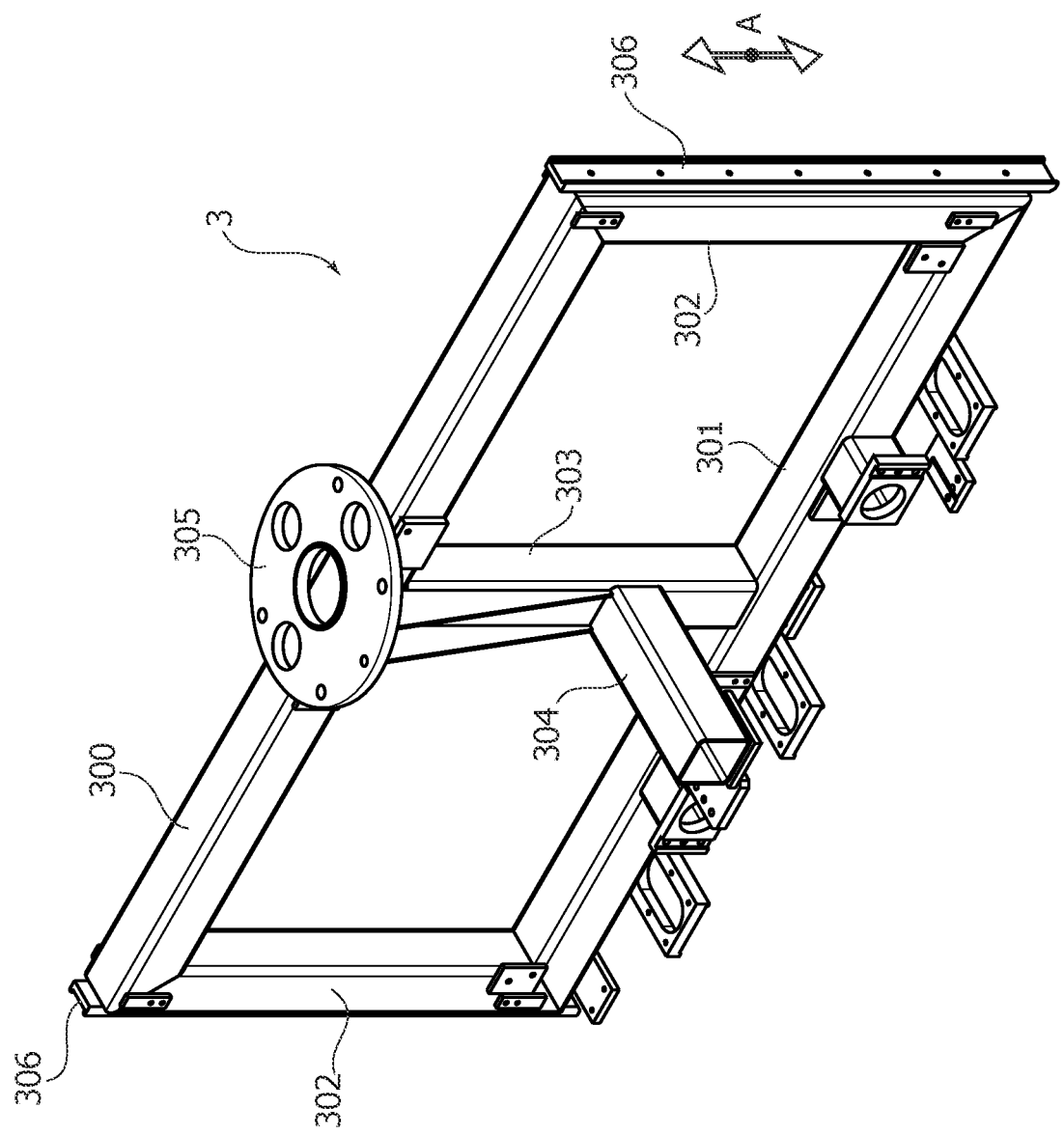

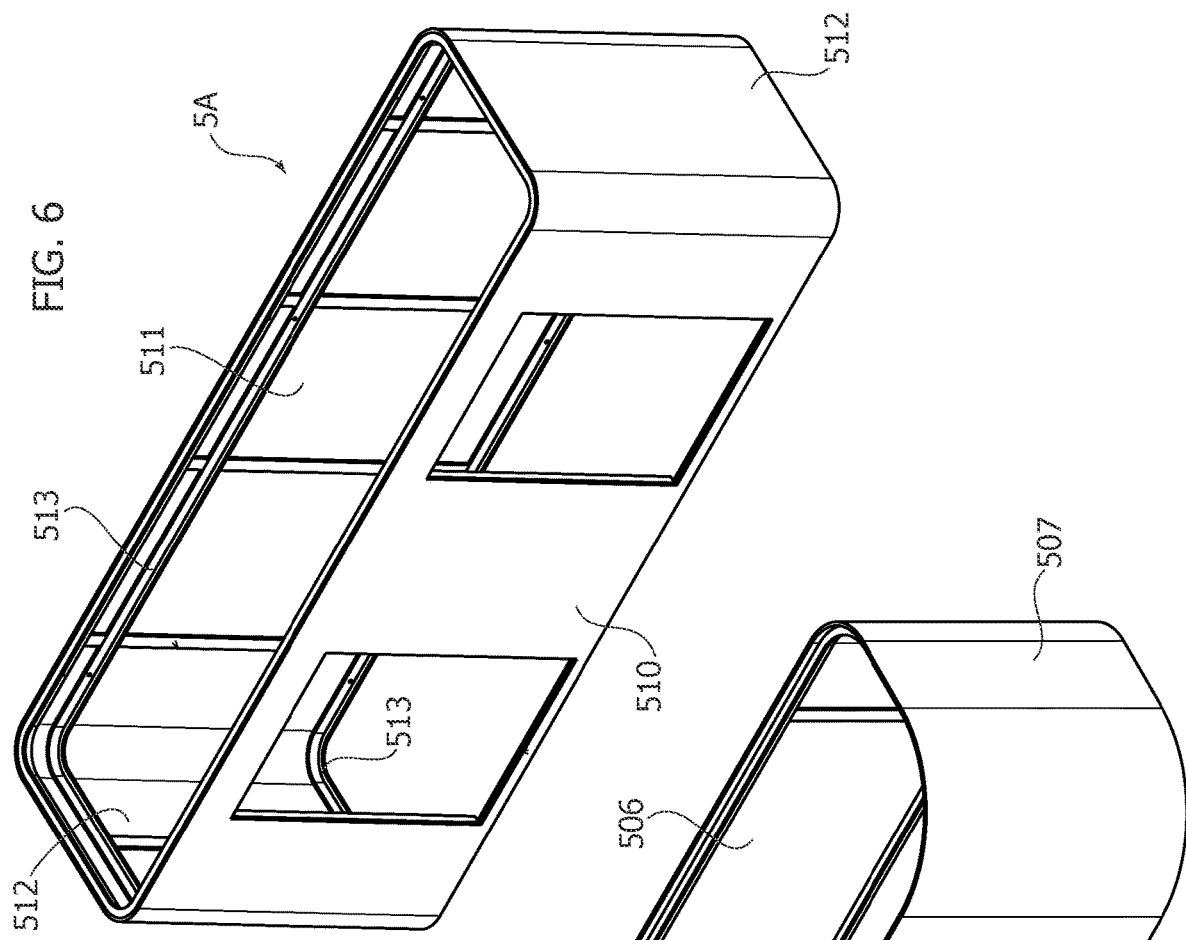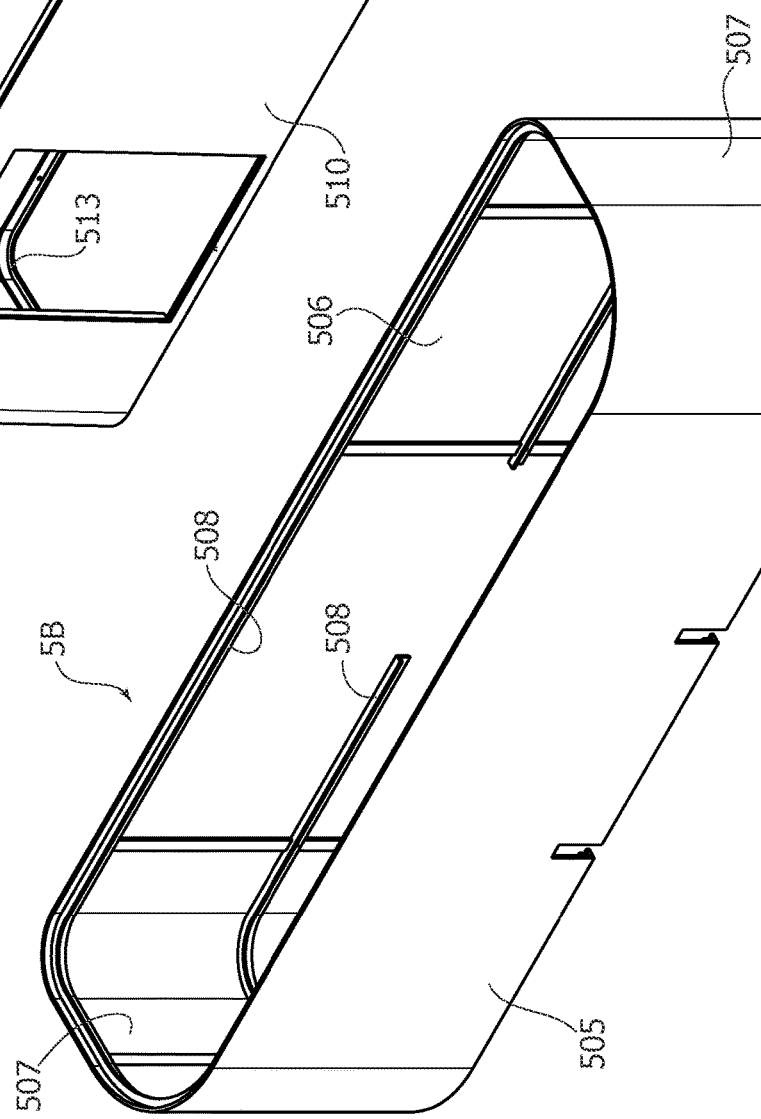

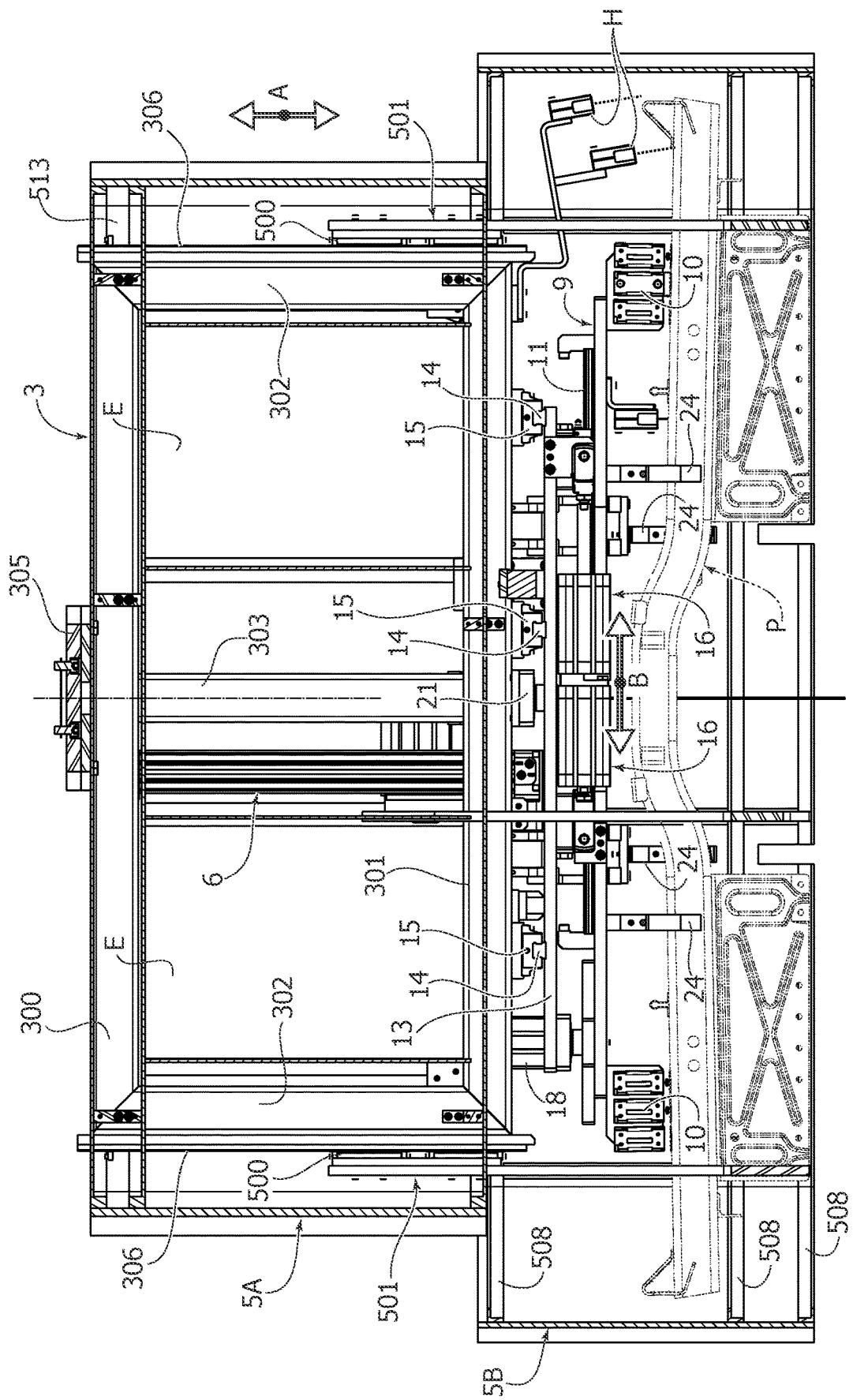

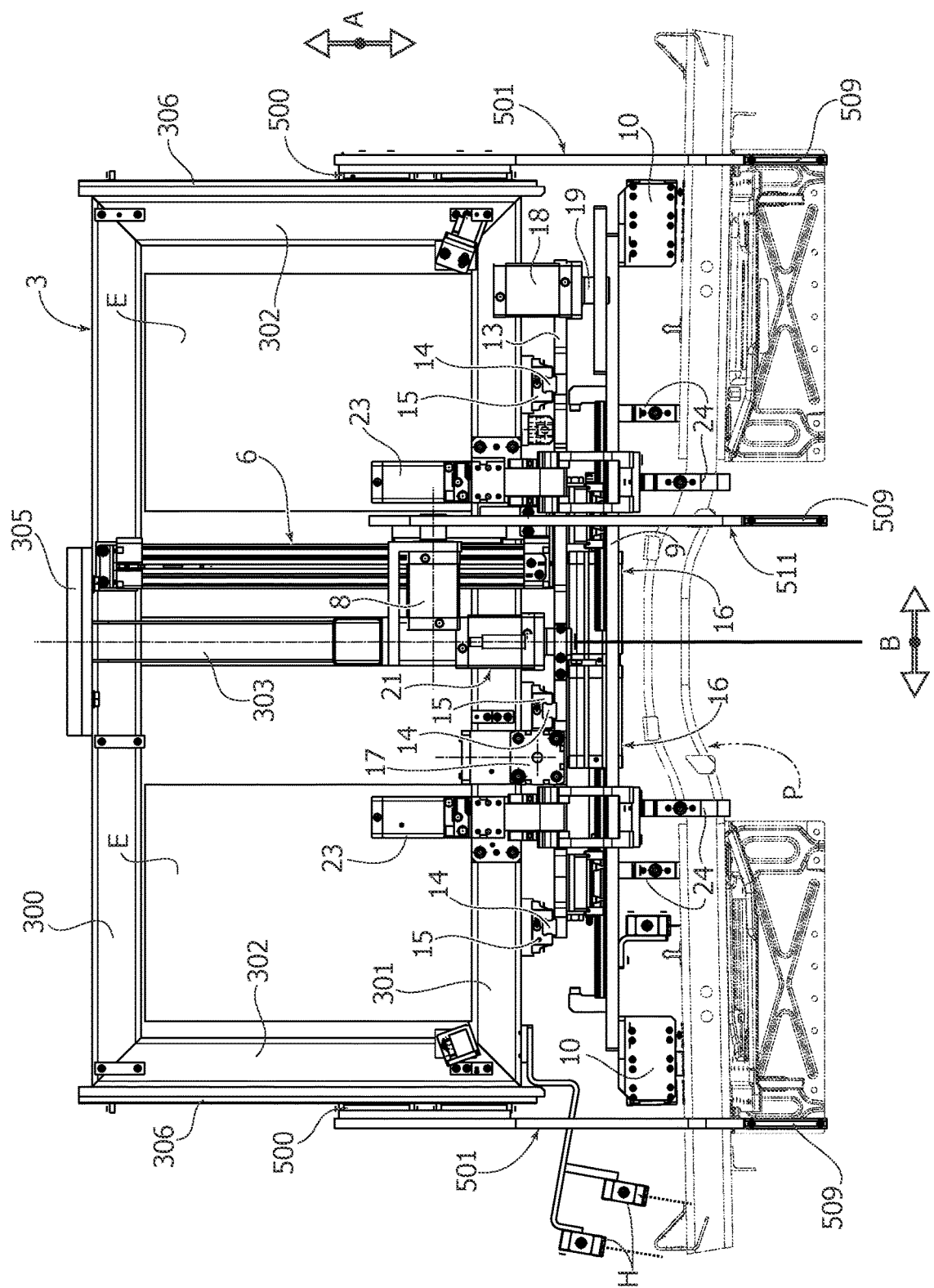

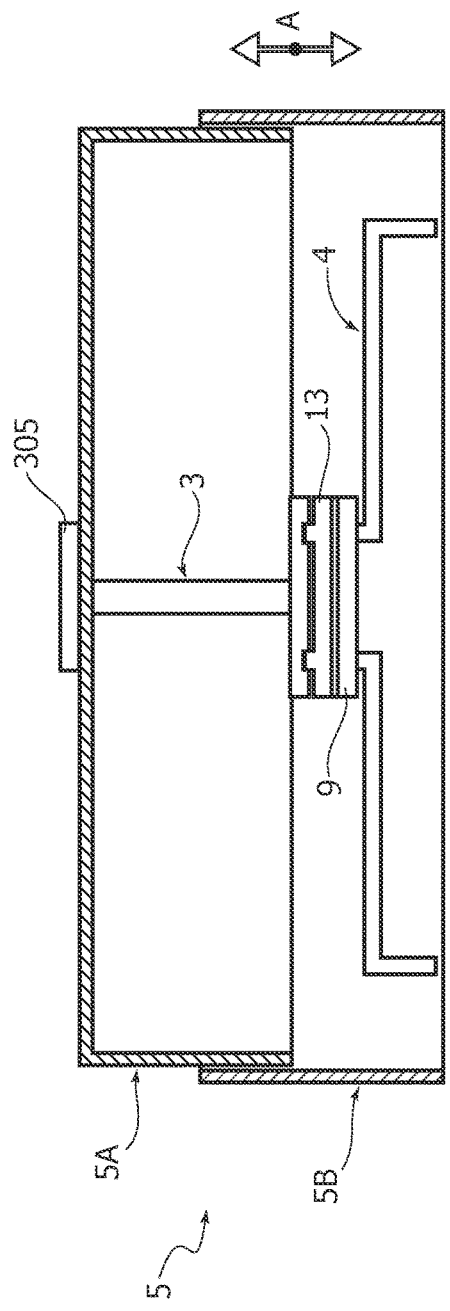
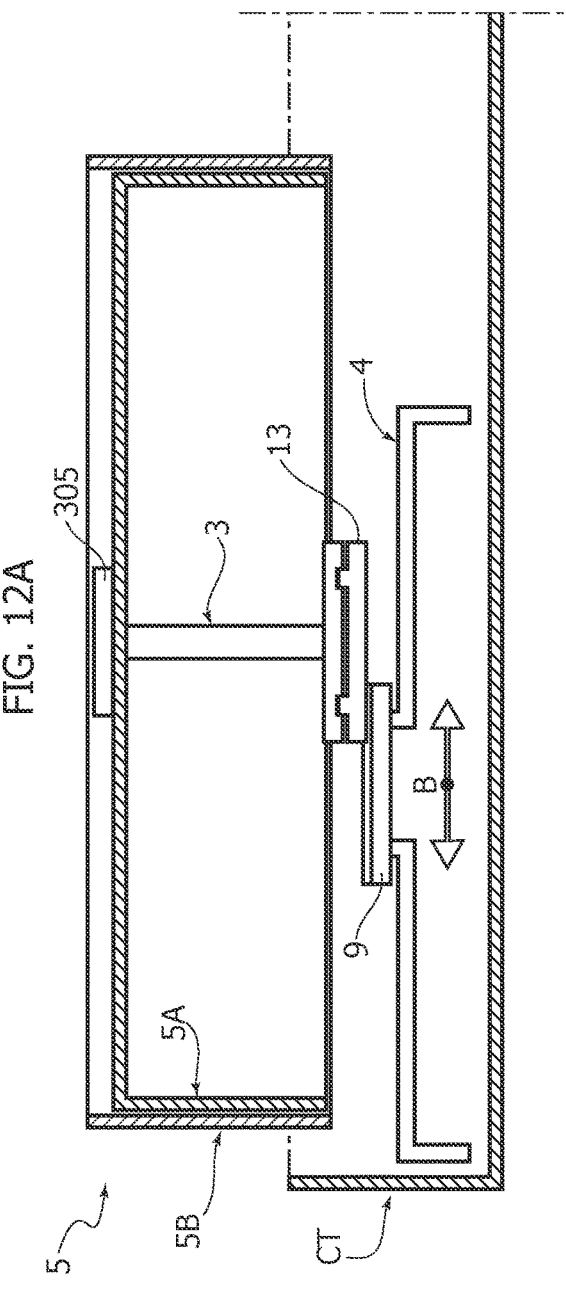

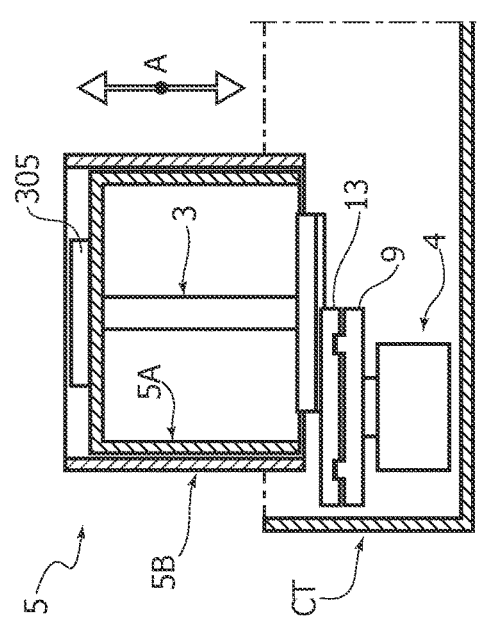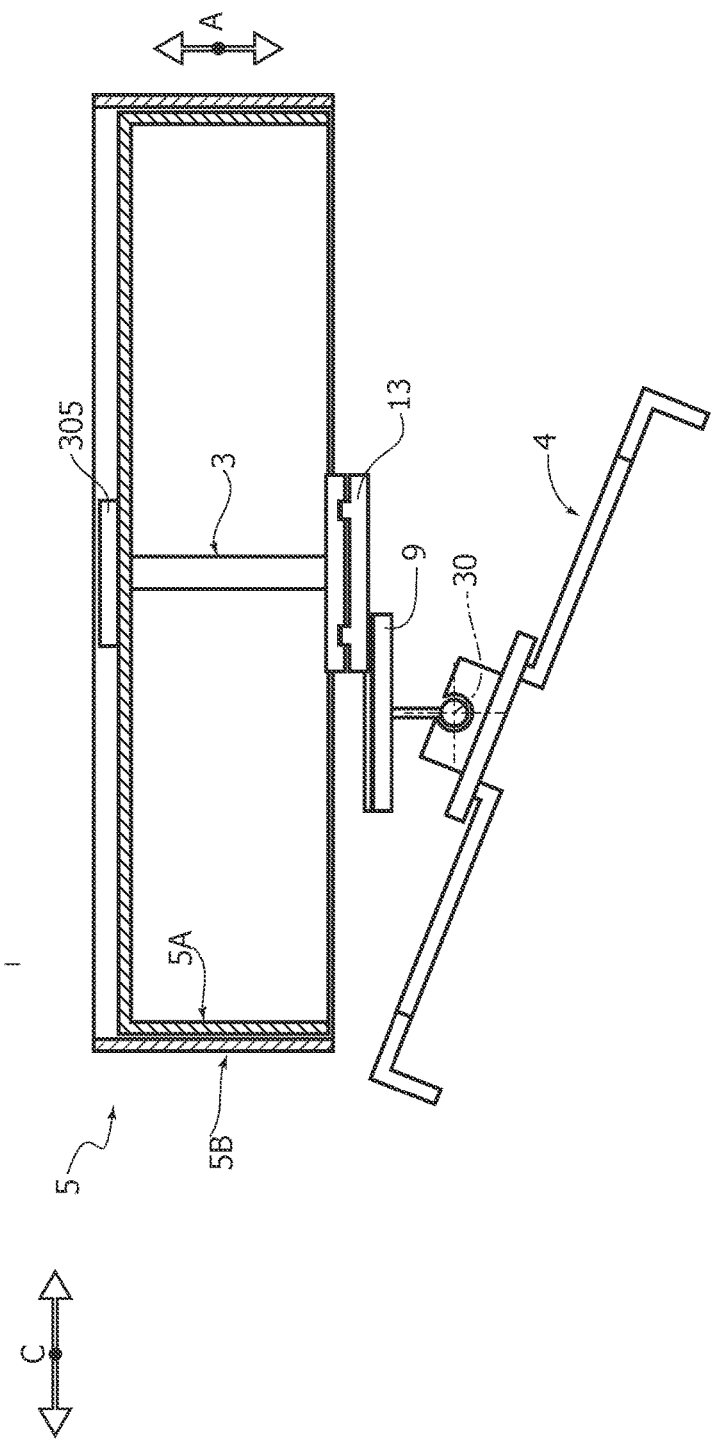

FUNCTIONAL ASSEMBLY FOR AN INDUSTRIAL MACHINE, IN PARTICULAR FOR A ROBOT, INCLUDING AN OPERATIVE UNIT EQUIPPED WITH A SAFETY COVER

CROSS-REFERENCE TO RELATED APPLICATION

This application claims priority benefit to European Patent Application No. 17177677.6 filed Jun. 23, 2017, the entire contents of which are incorporated herein by reference.

TECHNICAL FIELD

The present invention generally relates to an industrial robot having a safety cover.

BACKGROUND

The present invention relates to a functional assembly for an industrial machine, in particular for a robot, of the type comprising:
- a support frame, provided with a flange for attaching to a robot wrist or other element of an industrial machine,
- an operative unit, for example, a gripping tool or an operative tool, supported by said support frame,
- a safety cover for said operative unit, which is carried by said support frame, defining a containment volume,
- wherein said functional assembly can assume a first operative configuration, in which said safety cover surrounds and covers said operative unit and a second operative configuration, wherein said operative unit is at least partially outside the containment volume of said safety cover.

A functional assembly of the type indicated above is described and illustrated in the document WO 2017/036690 A1. In the known device of this document, an operative unit in the form of a gripping tool is carried by the wrist of a multi-axis manipulator robot. The gripping tool is surrounded by a safety cover and is movable between an extracted position for gripping a piece, and a retracted position in which it is received within the safety cover.

In recent times, industrial robots of the so-called "collaborative" type have been widely used, configured to operate in an open, non-enclosed environment, in which operators who carry out manual operations are also present. Of course, robots of this type must ensure the necessary degree of safety for operators and, for this reason, are provided with sensor systems capable of detecting when parts of the robot are too close or in contact with a foreign body, and in particular with an operator present in the same working area.

Therefore, the need to extend the same safety criteria to the end-effectors carried by collaborative robots is felt. The known solution indicated above is an example of an attempt in this direction, but it is not entirely satisfactory in terms of safety, functionality and constructive simplicity.

Functional assemblies of the above indicated type are also disclosed in DE 20 2013 105501 U1, DE 10 2012 217764 A1, WO 2017/158120 A1.

SUMMARY

The object of the present invention is that of providing a functional assembly of the type indicated above, which has a very high degree of safety with regard to its use in an open environment accessible to operators who must perform manual operations in the same working area.

Another preferred object of the present invention lies in the fact that a functional assembly of the above-mentioned type is provided, the performance of which is not affected by the size of the safety cover it is equipped with.

Another preferred object of the invention is that of reaching the aforesaid objectives with a relatively simple, lightweight and low-cost structure.

In view of achieving one or more of the aforesaid objects, the invention provides a functional assembly for an industrial machine, in particular for a robot, said functional assembly comprising:
- a support frame, provided with a flange for connection to a robot wrist or other element of an industrial machine,
- an operative unit, for example, a gripping tool or an operative tool, supported by said support frame,
- a safety cover for said operative unit, which defines a containment volume,
- wherein said functional assembly can assume a first operative configuration, wherein said safety cover surrounds and covers said operative unit and a second operative configuration, wherein said operative unit is at least partially outside the containment volume of said safety cover,
- wherein said safety cover has a fixed portion and a portion movable along a main direction with respect to the fixed portion, said movable portion of the safety cover being movable between a lowered position, wherein it surrounds and completely covers said operative unit, and a raised position, wherein said operative unit is uncovered, and wherein:
- the fixed portion of the safety cover is rigidly connected to said support frame which supports the operative unit,
- the movable portion of the safety cover is arranged outside the fixed portion and is movably mounted on said support frame,
- both the fixed portion and the movable portion of said safety cover have a collaborative outer structure, equipped with proximity sensors and/or contact sensors, such as to enable the functional assembly to be used in cooperation and in close proximity with one or more human operators.

In the present description and in the following claims, the expression "collaborative outer structure" is used to indicate a wall or cover equipped with proximity sensors and/or contact sensors of any type enabling the functional assembly to be used in cooperation and in close proximity with one or more human operators. The sensors can be able to automatically decrease the speed of movement of the robot or automatically stop the robot, whenever excessive closeness or contact with a foreign body, such as a human operator, is detected. This makes it possible to safely use the functional assembly even in an open, non-enclosed environment, in which there are human operators in the vicinity of the robot.

Thanks to the aforesaid characteristics, the functional assembly according to the invention is able to meet the necessary safety requirements; it does not have performances impaired by the presence of the safety cover, and is constructively simple and efficient during use.

According to another preferred characteristic, the operative unit of the invention is displaceable with respect to said support frame, at least in one transverse direction with respect to said main direction, so that said operative unit can be moved into close proximity to the boundaries of the footprint area in the plan of said movable portion of the safety cover. Thanks to the aforesaid characteristics, the safety cover of the functional assembly according to the invention does not constitute a limitation to the performance of the functional assembly. For example, in the case in which the operative unit is a gripping tool used to pick up pieces from a container, the size of the safety cover does not prevent the gripping tool from picking up pieces even located adjacent to the walls of the container. In the preferred embodiment, the aforesaid operative unit is movable with respect to said support frame in two auxiliary directions, orthogonal to each other, and orthogonal to said main direction. In another embodiment, said operative unit is also rotatable with respect to said support frame around an axis orthogonal to said main direction.

In the preferred embodiment, the functional assembly according to the invention is intended to be connected to the wrist of a multi-axis manipulator robot.

Compared to the solution disclosed in WO 2017/036690 A1, in which the safety cover is stationary relative to the attachment flange of the robot, and it is the gripping tool that is movable with respect to the cover, the present invention has several advantages.

Firstly, in the assembly according to the invention, the main part subject to movement is the aforesaid movable part of the safety cover, which has a "collaborative" structure, i.e. is equipped with sensors configured to detect the presence or closeness of an operator. This constitutes a substantial improvement in safety with respect to the aforesaid known solution, in which the main part subject to movement is a gripping tool which, in order to carry out gripping and unloading of the pieces, is required to come out from the cover. The gripping tool, due to its very nature, cannot have a collaborative structure, so that it always poses a danger for the operators located in the working area.

In the case of the assembly according to the invention, the main part subject to movement has a collaborative structure. Furthermore, the arrangement can be such so that the movable part of the collaborative cover is brought to its raised position, with the operative unit exposed, only when the entire assembly is in an area inaccessible to the operator, for example, within a picking-up container of the pieces.

A further advantage of the assembly according to the invention lies in the fact that the guiding and driving system of the movement of the safety cover is simpler and lighter with respect to a guiding and driving system of the gripping tool. Secondly, the present invention allows the provision, if desired, of an additional upward stroke of the movable portion of the safety cover, so that in its raised position, the movable portion can define an additional safety barrier extended upwards, above the working area.

Furthermore, in the case of the application of gripping of pieces in a container, the dimensions and the vertical stroke of the movable portion of the safety cover are preferably chosen according to the size of the pieces to be gripped, in such a way that once a piece is picked up, the cover can be lowered into a position in which the picked-up piece is contained within the safety cover. In this way, when the robot moves the functional assembly outside the pick-up container of the parts, the piece that is picked up cannot be a source of danger to the operators in the working area.

The invention is also directed to a robot or industrial machine provided with a functional assembly as set forth in the foregoing, wherein said robot or industrial machine includes a controller and wherein said controller is configured to receive signals from said proximity sensors and/or contact sensors of the safety cover to automatically decrease the speed of movement of said robot or industrial machine or to automatically stop said robot or industrial machine whenever excessive closeness or contact with a foreign body, such as a human operator, is detected.

BRIEF DESCRIPTION OF THE DRAWINGS

Further characteristics and advantages of the invention will become apparent from the description that follows with reference to the attached drawings, provided purely by way of non-limiting example, wherein:

FIG. 5 is a perspective view of the support frame forming part of the functional assembly of FIG. 3;

FIGS. 6 and 7 are respective perspective views of the fixed portion and the movable portion of the safety cover provided with the functional assembly of FIG. 3;

FIG. 8 is a partially sectioned elevational view of the functional assembly of FIG. 3, which also shows the fixed portion and the movable portion of the safety cover;

FIG. 9 is a partially sectioned, rear elevational view of the functional assembly of FIG. 3, where the safety cover has been removed;

FIGS. 11, 12A, 12B and 13 are diagrams illustrating the principle of operation of embodiments of the present invention.

DETAILED DESCRIPTION

The drawings show, by way of example, a functional assembly according to the invention, equipped with an operative unit in the form of a gripping tool, connected to the wrist of a multi-axis manipulator robot and usable for gripping pieces P arranged in a container CT.

Figure 1:
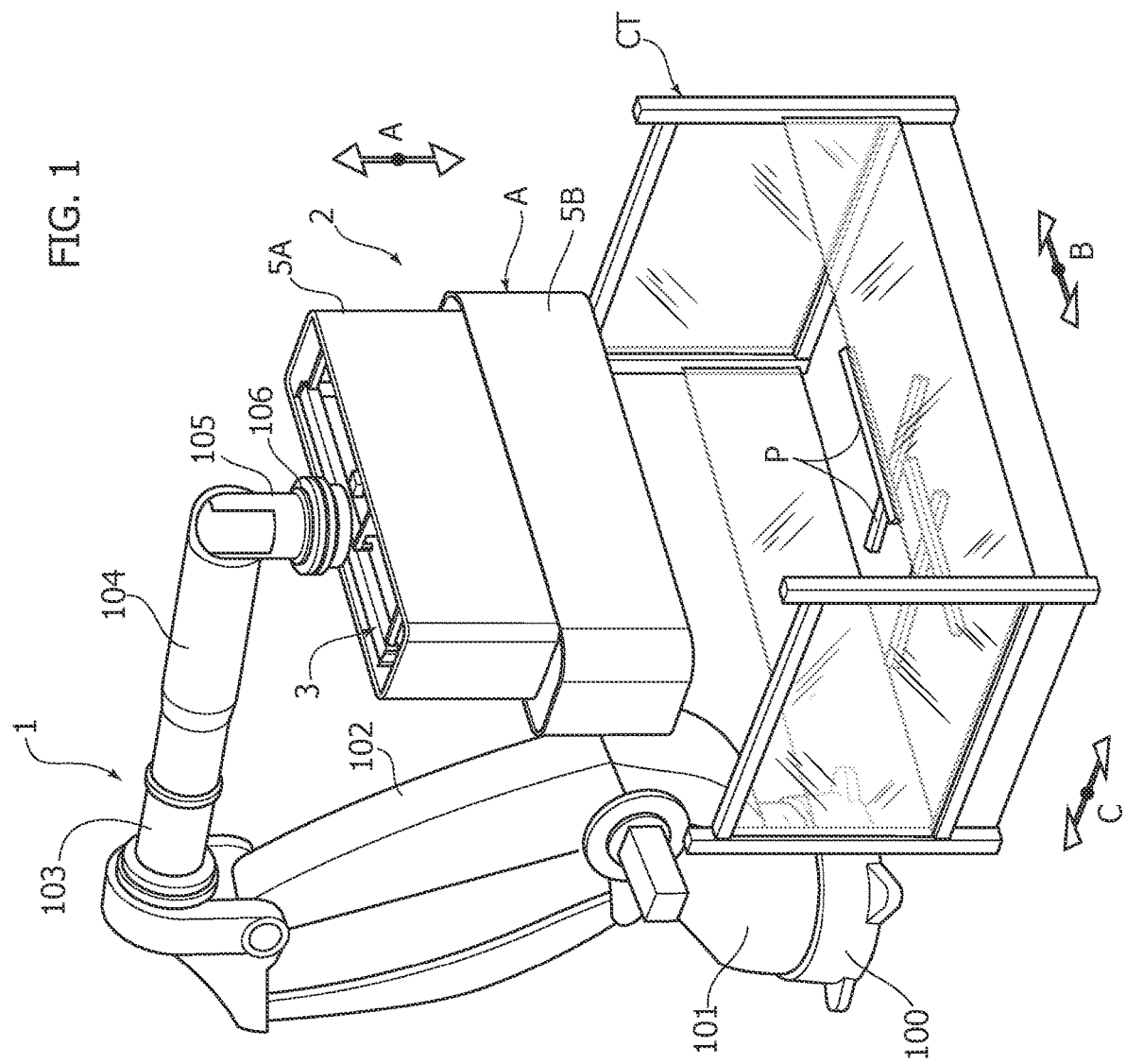
FIG. 1 is a perspective view of an industrial robot provided with a functional assembly according to the present invention, in a first operative condition.
Figure 2:
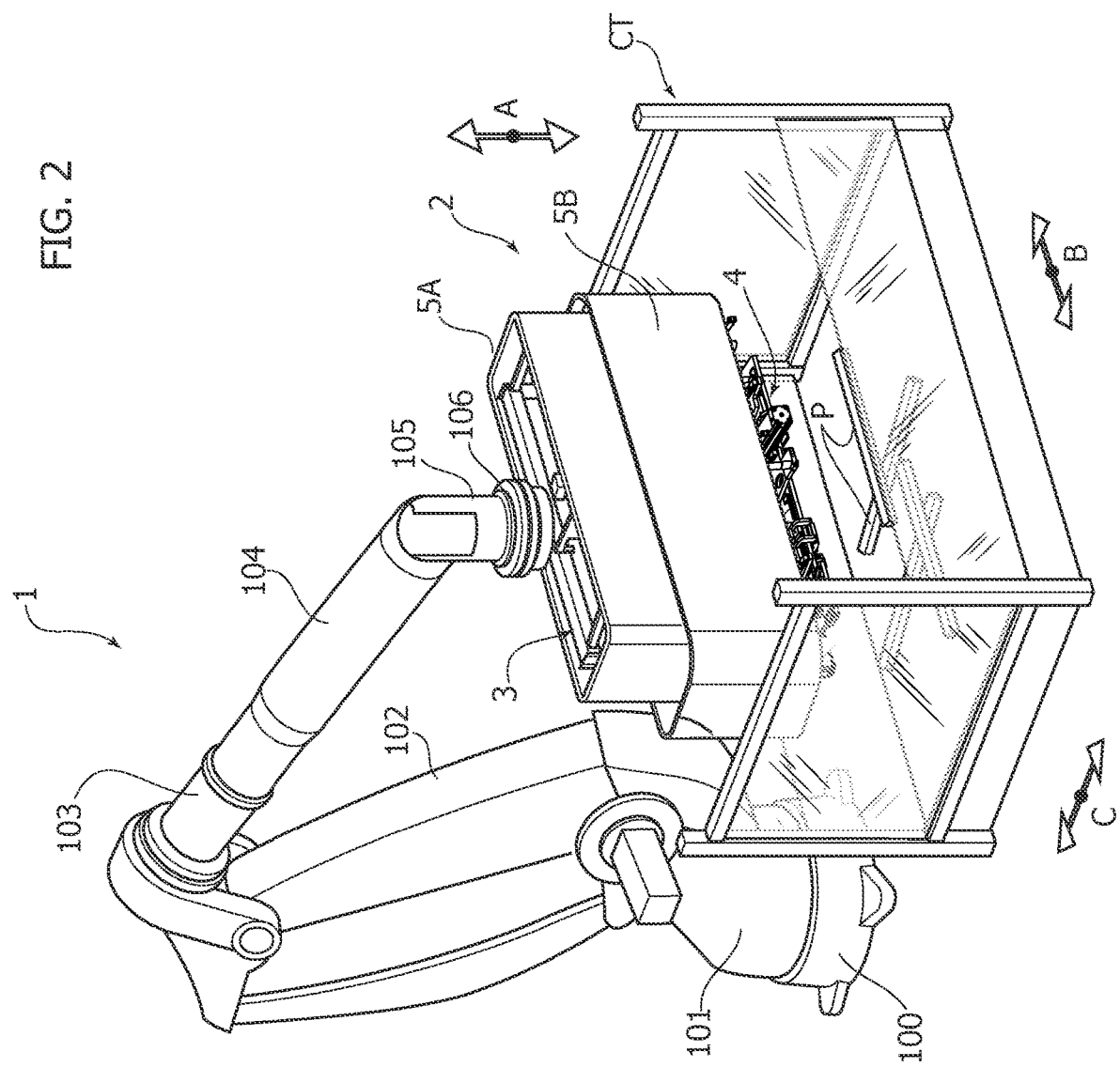
FIG. 2 is a perspective view of the robot of FIG. 1, in a second operative condition.

In FIGS. 1 and 2, numeral 1 indicates, in its entirety, a multi-axis manipulator robot, comprising a base 100 and a chain of robot elements 101, 102, 103, 104 mutually articulated to each other, and terminating with a robot wrist 105 provided with a flange 106 for connecting a functional assembly according to the invention.

Of course, the structure and configuration of the robot 1 can be of any known type. For this reason, the constructive details of the robot 1, such as the motors that drive the movements of the various robot elements and the electronic control system of the robot are not described or illustrated here, also because the removal of these details from the drawings makes them more readily and easily understood.

It should also be noted that the functional assembly according to the invention can also be used in an industrial machine that is different from a multi-axis manipulator robot, such as a Cartesian manipulator robot or any other type of machine configured to move an operative tool.

The functional assembly of the invention is indicated, in its entirety, in FIGS. 1 and 2 with the reference numeral 2.

The functional assembly comprises a support frame 3 rigidly connected to the attachment flange 106 of the robot wrist 105. The support frame 3 supports an operative unit, which is indicated, in its entirety, with reference numeral 4 (see also FIGS. 3, 4) and which, in the illustrated embodiment, is a gripping tool. It is well-understood that the invention is applicable to any other type of "end-effector", for example, a welding head, a staple head or any other type of tool or device, including opto-electronic vision devices.

The gripping tool 4 is surrounded and covered by a safety cover as indicated in its entirety in FIGS. 1, 2 by reference 5. Still according to the invention, the safety cover 5 comprises a fixed portion 5A rigidly connected to the support frame 3, and a movable portion 5B, which is movable with respect to the fixed portion 5A, and outside thereof, in a main direction A (FIGS. 1, 2).

According to a preferred embodiment, both portions 5A, 5B of the safety cover 5 have a sensorized outer structure provided with sensors, for example of the capacitive and/or piezo resistive type, configured for detecting the proximity and/or the contact with a foreign body. The details of the configuration and arrangement of these sensors are not described and illustrated here, since they may be of any known type.

However, in a preferred embodiment, each of the portions 5A, 5B of the safety cover has a structure of the type disclosed in European Patent Application EP 3 246 137 A1, filed by the same Applicant, and incorporated herein by reference. According to the solutions proposed in that patent application, the sensorized cover comprises a plurality of active layers and passive layers including:
  a support structure of rigid or semi-rigid material (for example metal or plastic material) having a predetermined shape,
  a damping layer formed of elastically yielding material, associated with an outer side of the support structure,
  a piezo resistive contact sensor above the damping layer, which includes a piezo resistive layer interposed between a lower electrically conductive layer and an upper electrically conductive layer,
  a lower covering layer and an upper covering layer formed of electrically insulating material, between which the piezo resistive contact sensor is interposed,
  a capacitive proximity sensor, arranged above the piezo resistive contact sensor, comprising a first electrically conductive layer and a second electrically conductive layer, between which an intermediate layer of electrically insulating material is arranged,
  an outer structure layer above the capacitive proximity sensor, preferably formed with electrically insulating material.

Thanks to the design of the safety cover 5 with a sensorized structure, the robot control system is able to automatically stop the robot whenever excessive closeness or contact with a foreign body is detected. This makes it possible to safely use the functional assembly even in an open, non-enclosed environment, in which there are operators in the vicinity of the robot.

Of course, for applications of this type, the robot 1 carrying the functional assembly is also preferably a "collaborative"-type robot, that is, configured to operate safely in an environment in which operators have access to. To this end, these robots are generally equipped with casings that surround the movable elements of the robot and which are equipped with a sensorized outer surface.

The movable portion 5B of the safety cover 5 of the functional assembly according to the invention is movable between a lowered position, in which the gripping tool 4 is completely covered and surrounded by the safety cover 5 and a raised position (FIG. 2) in which the gripping tool protrudes beneath the cover 5, so that it can grip a piece P within the container CT without the cover 5 interfering with the picked-up piece P.

Of course, in the present description and in the attached claims, the terms "raised" and "lowered" are used with reference to a vertical orientation of the main direction A. Obviously, if the robot orientates the functional assembly in order to change the main direction A so it is no longer vertical, the movement of the movable cover nevertheless follows the direction A and the movable portion 5B is, however, able to move between an extreme covered position of the tool 4 and an opposite extreme position, in which the tool 4 is uncovered.

During use, the movable lower portion 5B of the safety cover 5 is only raised when the functional assembly 2 moves within the container CT, as in this condition, contact between the gripping tool 4 and a foreign body (in particular an operator who is near the container CT) is excluded. The movable portion 5B is, instead, held in its lowered position when the functional assembly 2 is moved by the robot 1 into the area outside the container CT to ensure the necessary safety for the operators present in the same area.

Compared to the solution disclosed in WO 2017/036690 A1, in which the safety cover is stationary relative to the attachment flange of the robot, and it is the gripping tool that is movable in the main direction A, the present invention has several advantages. Firstly, the guiding and driving system of the movement of the safety cover is simpler and lighter than a guiding and driving system of the gripping tool. Secondly, the present invention allows the arrangement, if desired, of an additional upward stroke (with reference to FIGS. 1 and 2) of the movable portion of the safety cover, in such a way that, in its raised position, the movable portion creates a safety barrier, above the walls of the container.

Furthermore, as will be seen in more detail below, the system according to the invention provides a preferred embodiment wherein the operative unit 4 (in the example shown, the gripping tool 4) is also movable at least in one direction orthogonal to the main direction A, so that when the movable portion 5B of the safety cover is raised, the operative unit 4 can be moved outside the footprint of the containment volume of the movable portion of the safety cover. In this way, the performance of the operative unit is not reduced due to the size of the safety cover. As indicated, this aspect will be discussed in greater detail below.

The configuration of the support frame 3 in the case of the specific example shown here is clearly visible in FIG. 5, as this figure only shows the frame 3. The frame comprises an upper crossbar 300 and a lower crossbar 301, parallel and spaced apart from each other, which are rigidly connected by two lateral uprights 302 and a central upright 303, from which an overhanging beam portion 304 protrudes. Still with reference to the specific example illustrated, all the elements 300-304 are in the form of welded metal sheet elements, with a quadrangular cross-section. Above the central portion of the upper crossbar 300, a circular flange 305 is welded, used for rigidly connecting, by screwing, to the flange 106 of the wrist 105 of the robot 1.

On the sides of the two lateral uprights 302, two guide sections 306 are provided for the sliding guide in the main direction A of the movable portion 5B of the safety cover 5.

Figure 3:
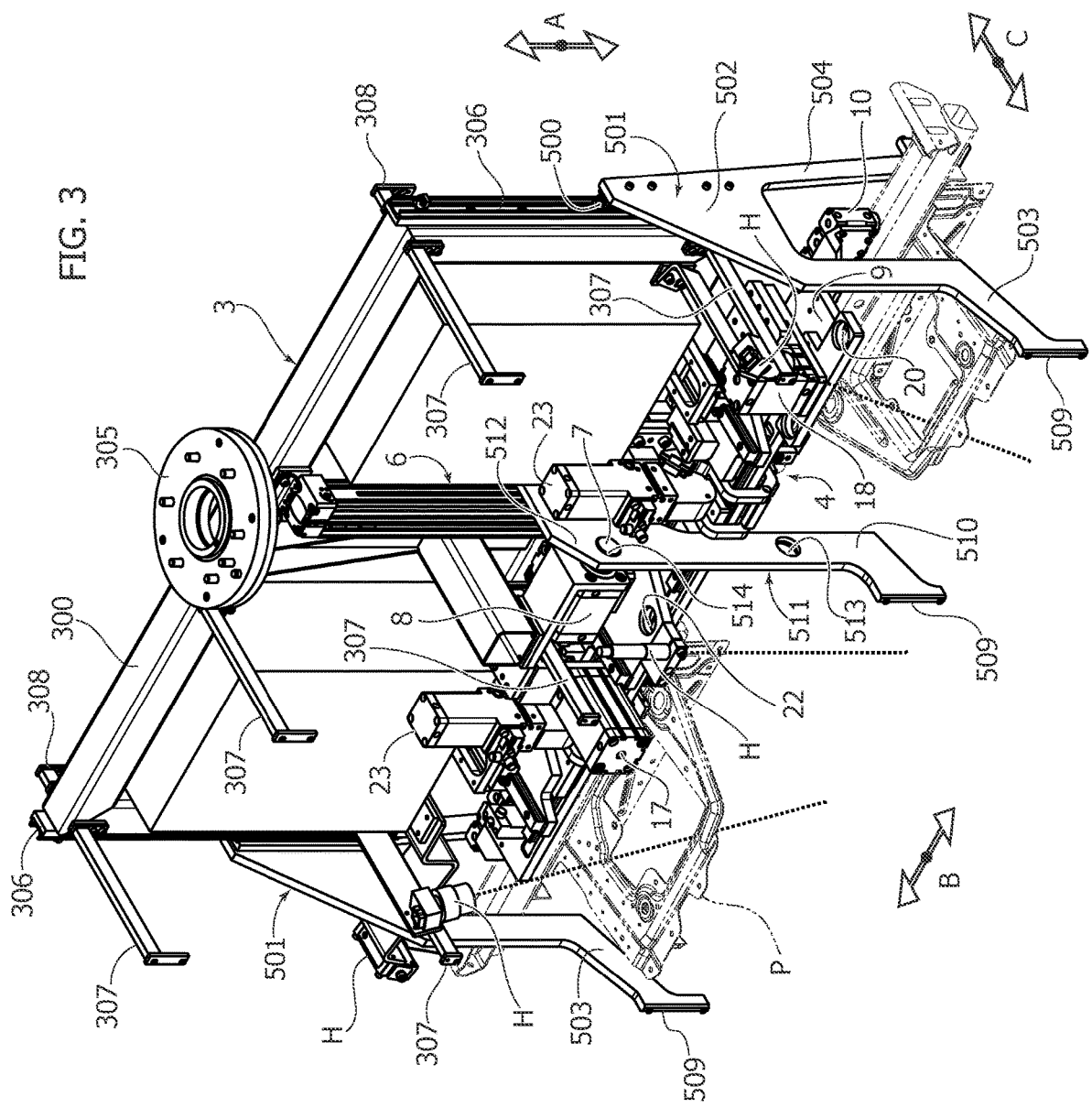
FIG. 3 is a front perspective view of an embodiment of the functional assembly according to the invention, in which the safety cover has been removed.
Figure 4:
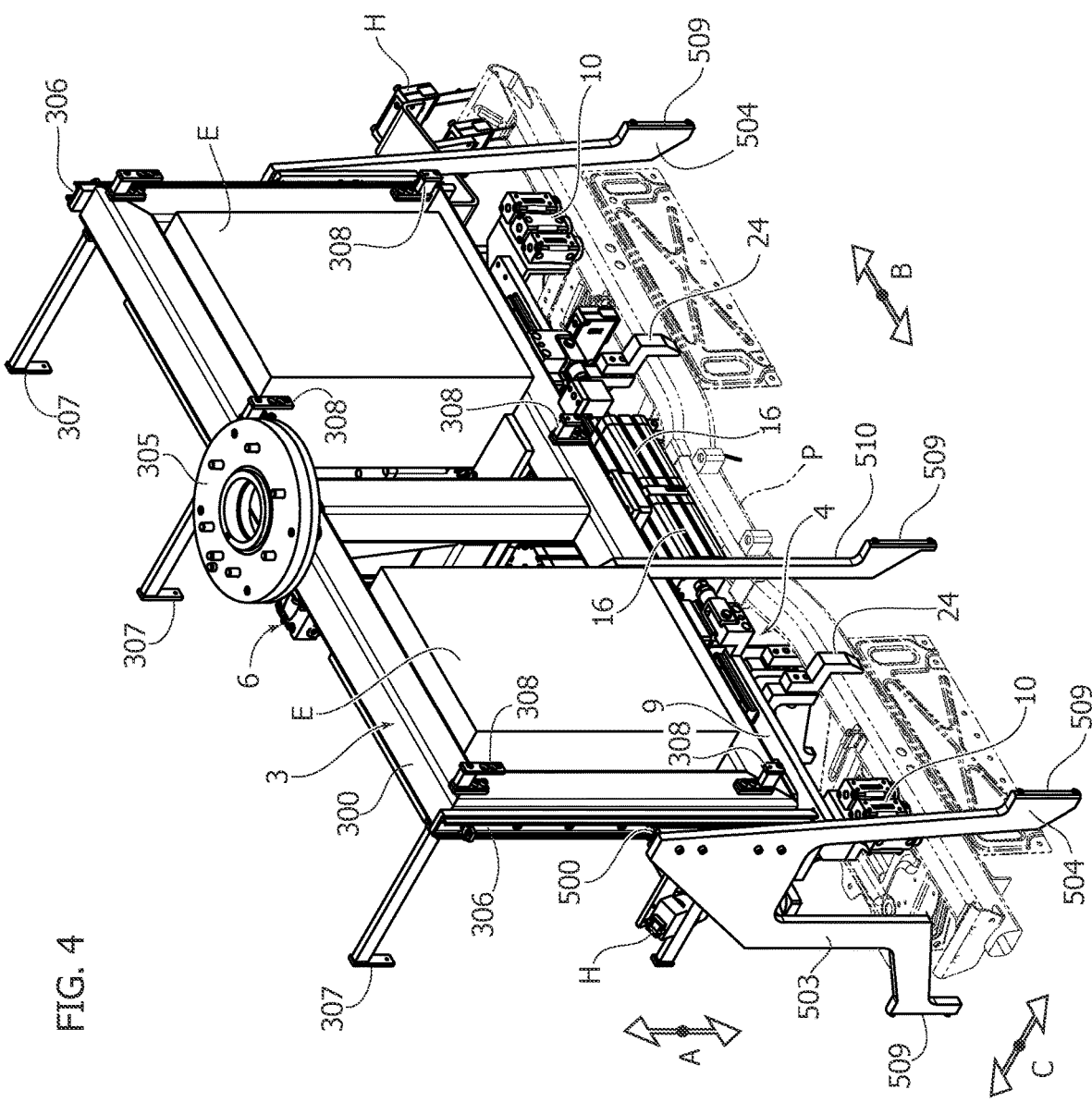
FIG. 4 is a rear perspective view of the functional assembly of FIG. 3, in which the safety cover has been removed.

With reference to FIGS. 3 and 4, within the guide sections 306, respective shoes 500 are slidably mounted, rigidly connected to two side plates 501, which support the movable portion 5B of the safety cover 5. Each plate 501 extends in an essentially orthogonal plane to the general plane of the support frame 3 and has an upper portion 502 of a triangular profile, from which a front arm 503 and a rear arm 504 protrude.

The movable portion 5B of the safety cover 5 is illustrated by itself in FIG. 7. It is in the form of a casing consisting of a sheet of metal or synthetic material wound on itself so as to have a front main wall 505, a rear main wall 506 and two end walls 507. The casing wall is rigidly connected (for example, by screwing or bonding) to inner bands 508 that are secured, for example by screwing, to the attachment end 509 of the arms 503, 504. As indicated above, the support structure of the casing 5B carries a sensorized cover, for example, having the stratified structure that has been described above.

The casing of the movable portion 5B of the safety cover is also secured to the attachment end 509 of two arms 510 forming part of a plate 511 arranged in an intermediate position between the two side plates 501. The plate 511 also has an upper portion 512 from which the two arms 510 protrude and which is directly controlled by an actuator 6 designed to drive the movement of the movable part 5B of the safety cover along the main direction A. The actuator 6 can be of any known type, for example, it can be a fluid actuator or electric actuator. The actuator body 6 is supported by the frame 3, having its ends rigidly connected to the upper crossbar 300 and to the lower crossbar 301 of the frame 3.

In the example illustrated, the actuator 6 is a pneumatic linear actuator of the non-stem type, including an outer body of fixed-length and a lateral slot from which a movable member protrudes, which is rigidly connected to the upper part of the intermediate plate 512. The constructive details of the actuator 6 are not illustrated here, since this actuator is of any known commercially-available type. A linear actuator without stem of this type is, for example, manufactured and marketed by the company Festo AG & Co. KG.

Still with reference to FIGS. 3, 4, from the crossbars 300 and 301 of the support frame 3, overhanging front brackets 307 and rear brackets 308 protrude, to which the casing of the upper fixed portion 5A of the safety cover 5 is connected.

The upper portion 5A of the safety cover is illustrated by itself in FIG. 6. In this case as well, this portion of the safety cover comprises a casing consisting of a metal sheet or synthetic material wound on itself in order to define a front main wall 510, a rear main wall 511A and two end walls 512. The casing of the cover portion 5A is secured by means of screws or by bonding to circumferential bands 513 which are, in turn, secured to the attachment brackets 307, 308 as described above.

As with the portion 5B, the portion 5A also has a support casing that carries a sensorized wall, for example, having the stratified structure described above.

During use, the actuator 6 is operated to control a vertical movement (with reference to FIGS. 3, 4) of the movable portion 5B of the safety cover relative to the fixed portion 5A. As is evident from the above description, the actuator 6 directly operates the intermediate plate 511, whose connecting ends 509 are secured to the casing of the movable portion 5B of the safety cover. The movement of the movable portion 5B is guided both directly by the actuator 6, and by engagement of the shoes 500 carried by the lateral plates 501 in the two lateral guide profiles 306.

Still with reference to the specific example illustrated, the movable portion 5B of the safety cover 5 is precisely set in position and lockable, both in its lowered position and in its raised position, by engagement of a shutter pin 7 within a first hole 513 (FIGS. 3 and 10) or within a second hole 514. The holes 513, 514 are formed in the intermediate plate 511. The shutter pin 7 is driven axially by a pneumatic actuator 8 whose body is rigidly supported by the beam portion 304 (FIG. 5) of the support frame 3.

Figure 10:
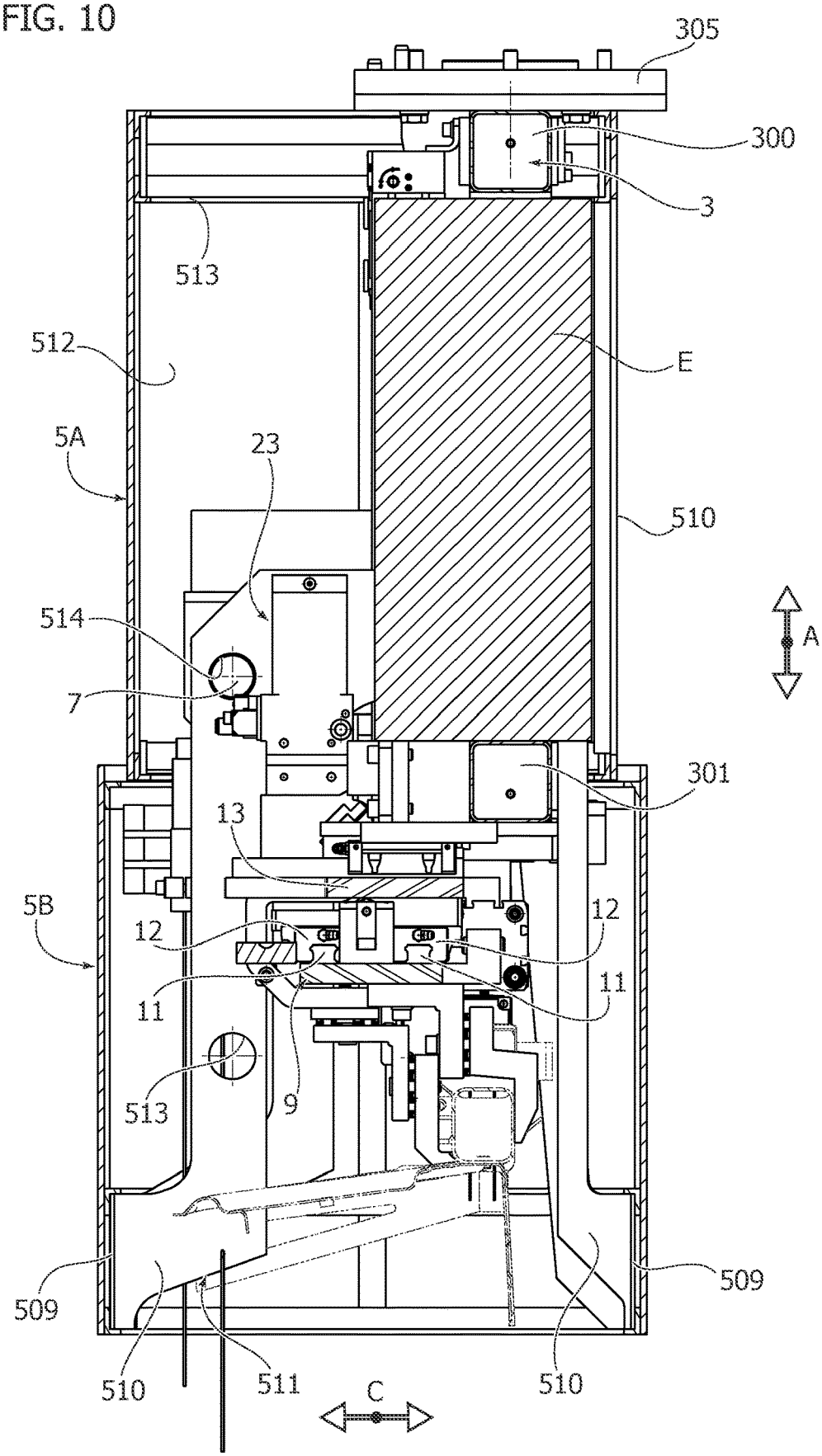
FIG. 10 is a side and cross-sectional view of the functional assembly of FIG. 3, which also shows the fixed portion and the movable portion of the safety cover.

Now with reference in particular to FIGS. 8-10, in the case of the specific example illustrated, the operative unit 4 is formed of a gripping tool including a lower support plate 9, of elongated shape, the plane of which is orthogonal to the main direction A, and which extends in parallel to a direction B, orthogonal to the direction A, and parallel to the crossbars 300, 301 of the support frame 3. The bottom plate 9 supports gripping tools 10 at its ends, which in the illustrated example are magnetic or electromagnetic.

The support plate 9 is slidably guided along its longitudinal direction B by means of the engagement of sliders 11 within guides 12 (see FIG. 10) carried by an upper support plate 13 (see FIG. 10 again) placed above the plate 9 (see also FIG. 8 in particular). The plate 13 also lies in a plane orthogonal to the main direction A and has an elongated shape extending in parallel to the direction B. The plate 13 is slidably guided with respect to the support frame 3 in a direction C, orthogonal to both the main direction A and the direction B. The sliding assembly of the plate 13 with respect to the support frame 3 is obtained by means of engagement of sliders 14 carried by the plate 13 within guides 15 carried by the lower crossbar 301 of the support frame 3.

The movement of the support plate 9 in the direction B is controlled by two pneumatic actuators 16 (see FIGS. 4 and 8) rigidly connected below the plate 13. The two actuators 16 are used to control the movement of the plate 9 between a central position and two opposite extreme positions, each actuator being able to control the stroke between the central position and a respective extreme position. Of course, it would also be possible to adopt a single larger pneumatic actuator, which controls the entire stroke between the two extreme positions. The movement of the plate 13 in the direction C is controlled by a single actuator 17 (see FIGS. 3 and 9), which is rigidly connected to the support frame 3. The actuator 17 is also preferably a pneumatic actuator, provided that it is possible to adopt actuators of any type, particularly including electric actuators.

The operative positions of the plate 9 and the plate 13 can also be precisely set and are lockable by activating shutter devices. For example, FIG. 9 illustrates a pneumatic actuator 18 carried by the plate 13, which operates a shutter pin 19, configured to selectively cooperate with holes 20 (one of which is visible in FIG. 3) formed in elements integral with the plate 9 for setting into position and locking the plate 9 into its operative end positions. The operative positions of the plate 13 are also precisely settable and lockable by engagement of a shutter pin operated by an actuator 21 within holes 22 (one of which is visible in FIG. 3) formed in elements integral with the plate 13. The actuators 18 and 21 can also be of any type.

Finally, the functional assembly of the illustrated example is provided with two actuators 23 (FIGS. 3 and 9), for example of the pneumatic type, which operate gripping hands 24 provided for safety, in addition to magnetic devices 10, to ensure that the piece P gripped by the tool cannot fall in the event of failure of the magnetic devices.

On the support frame 3, two control units E are also mounted on all the actuator devices which are provided by the functional assembly. In the case of the specific example illustrated, where the actuator devices are all of the pneumatic type, the control units comprise assemblies of solenoid valves for controlling the operation of the various actuators according to a predetermined logic programmed in an electronic control unit of the solenoid valves.

The functional assembly is also preferably provided with opto-electronic units H.

Figure 14:
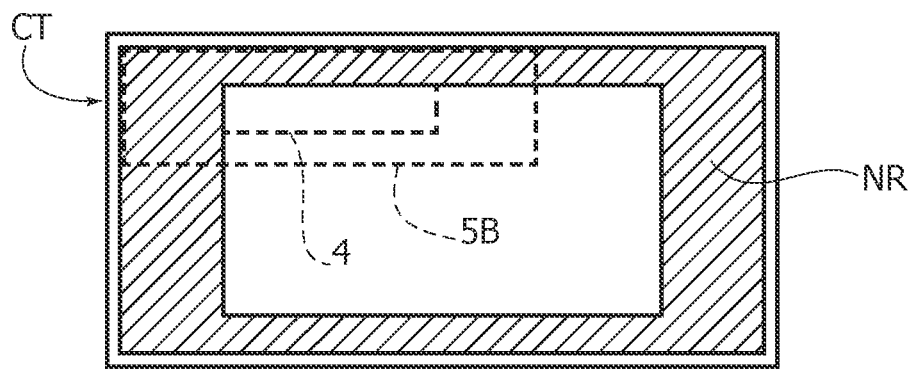
FIGS. 14-16 are diagrams illustrating the advantages of the invention.
Figure 15:
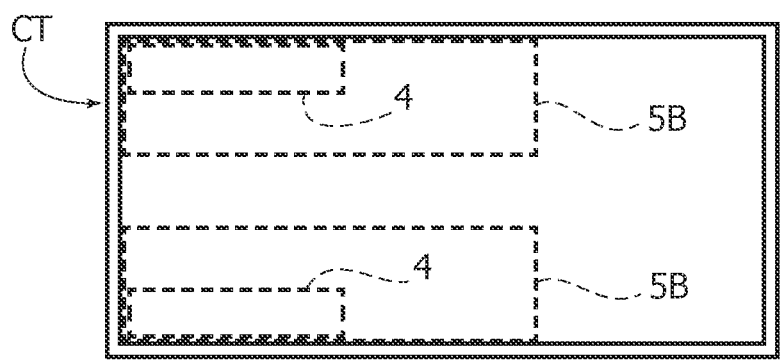
Figure 16:
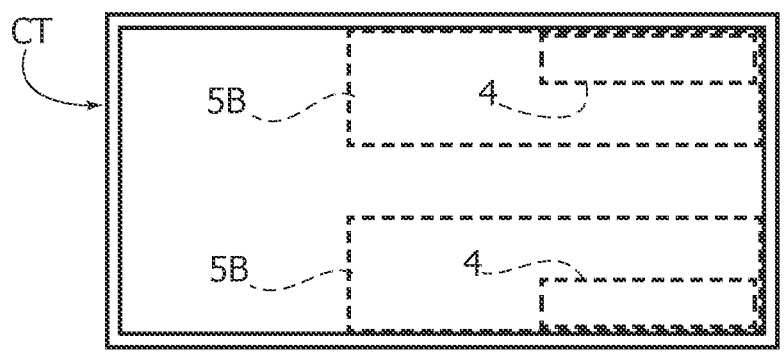

FIGS. 11 and 12A, 12B illustrate a schematic of the functional assembly described above, in the operative condition with movable portion 5B of the safety cover lowered (FIG. 11) and in the operative condition with movable portion 5B in a raised position (FIGS. 12A, 12B, where FIG. 12A shows a front view and FIG. 12B shows a side view). FIGS. 12A, 12B show a condition in which, once the movable portion 5B of the safety cover has been raised, the gripping tool 4 can be moved transversally in both direction B (FIG. 12A) and in direction C (FIG. 12B) in order to move to the boundaries of the footprint area of the safety cover 5 (particularly of the lower portion 5B), so that it can also operate adjacent to a side wall of the container CT without risk of interference of the cover 5 with the container CT. The advantages of the invention from this point of view are made apparent from FIGS. 14-16. FIGS. 14-16 schematically show—in a plan view—the container CT from which the assembly according to the invention must pick up the pieces. In FIG. 14, the reference 5B indicates the footprint of the movable part 5B of the safety cover 5, when it is positioned in a corner of the container CT. Still in FIG. 14, reference 4 indicates the footprint of the gripping tool 4 if this were to always remain at the center of the safety cover. As is evident, this condition would lead to the inability of bringing the tool 4 into contact with the walls of the container CT. The entire perimeter area that, in FIG. 14, is dashed and indicated with reference NR would be unreachable (Not Reachable) for the tool. FIGS. 15 and 16 instead show that in the assembly according to the invention, thanks to the possibility of moving the tool 4 in the directions B and C, indicated in FIGS. 12A, 12B, the tool 4 can come into contact with any of the four corners of the container or, of course, in any intermediate position between those shown, in which the tool is adjacent to a single wall of the container CT.

FIG. 13 shows an embodiment in which the gripping tool 4 is connected to the support frame so that it can also be rotatable at least about one axis 30 with respect to the fixed frame 3. The example illustrated refers to the case in which a spherical joint is provided. FIG. 13 shows an additional advantage of the functional assembly according to the invention. As can be seen, the movable portion 5B of the safety cover can be arranged to have a raised position in which it can protrude above the fixed portion 5A. In particular, it is thus possible to arrange the movable part of the cover 5 in such a way that it overlaps in height and surrounds the end of the robot so as to increase the degree of safety in the area where the robot operates.

Of course, without prejudice to the principle of the invention, the details of construction and the embodiments may vary widely with respect to those described and illustrated purely by way of example, without departing from the scope of the present invention.

What is claimed is:

1. A functional assembly for use by an industrial robot having a robot wrist, said functional assembly comprising:
    a support frame, provided with a flange for attaching to the robot wrist;
    an operative unit end effector supported by said support frame;
    a safety cover for said operative unit, which defines a containment volume;
    wherein said functional assembly includes a first operative configuration, wherein said safety cover circumferentially surrounds and covers said operative unit about a main direction and is positioned within the safety cover containment volume and a second operative configuration, wherein said operative unit is positioned at least partially outside the safety cover containment volume and not circumferentially covered by the safety cover;
    wherein said safety cover has a fixed portion and a portion movable along the main direction with respect to the fixed portion, said movable portion of the safety cover being movable between a lowered position, wherein it circumferentially surrounds and covers said operative unit about the main direction, and a raised position, wherein said operative unit is at least partially uncovered by the movable portion;
    and wherein:
    the fixed portion of the safety cover is rigidly connected to said support frame which supports the operative unit;
    the movable portion of the safety cover is arranged circumferentially coaxially outside the fixed portion and is movably mounted on said support frame;
    both the fixed portion and the movable portion of said safety cover are provided with a collaborative outer structure, equipped with at least one of proximity sensors or contact sensors, operable to detect a foreign body adjacent to the safety cover.

2. The functional assembly according to claim 1, wherein said operative unit is movable with respect to said support frame at least in one transverse direction with respect to said main direction, in such a way that when said movable portion of the safety cover is in the raised position, said operative unit is movable in a position outside a footprint of the containment volume defined by said movable portion of the safety cover.

3. The functional assembly according to claim 2, wherein said operative unit is movable in two auxiliary directions relative to said support frame, said two auxiliary directions being orthogonal to each other and being orthogonal to said main direction.

4. The functional assembly according to claim 1, wherein it comprises a first plate slidably guided along a first auxiliary direction on said support frame, and a second plate carrying the operative unit, the second plate guided on said first plate in a second auxiliary direction orthogonal to the first auxiliary direction and the main direction.

5. The functional assembly according to claim 4, further comprising:
    an actuator device connected to the support frame operable to selectively forcibly move the movable portion of the safety cover in the main direction relative to the fixed portion of the safety cover;
    an actuator device for moving said first plate;
    an actuator device for moving said second plate; and
    a plurality of shutter devices for respectively precisely setting into position and locking said movable portion of the safety cover, said first plate and said second plate.

6. A functional assembly according to claim 5, wherein on said support frame, at least one control unit is mounted for controlling said actuator devices and said shutter devices.

7. The functional assembly according to claim 4, wherein said operative unit is supported in such a way to also be rotatable, at least about one axis with respect to the support frame.

8. The functional assembly according to claim 1, wherein in the safety cover raised position, the movable portion of the safety cover extends above said flange.

9. The functional assembly according to claim 1, wherein said operative unit comprises a gripping tool operable to grip pieces in a container, characterized in that a dimension of the movable portion, and a vertical stroke of the movable portion, of the safety cover are predetermined according to a size of the pieces to be gripped, so that once one of the pieces is picked up, the movable portion of the safety cover can be lowered into the lowered position wherein the picked-up piece is contained within the safety cover.

10. The functional assembly according to claim 1 further comprising a multi-axis robot having a robot wrist connected to the support frame flange, wherein said robot comprises a controller, wherein said controller is configured to receive signals from said at least one of proximity sensors or contact sensors connected to the safety cover, the robot operable to automatically at least one of decrease a speed of movement of said robot or to automatically stop said robot whenever excessive at least one of closeness or contact with a foreign body is detected.

11. The functional assembly of claim 1 wherein the support frame further comprises:
   a tubular upper crossbar having opposing ends;
   a tubular lower crossbar having opposing ends; and
   a tubular lateral upright connecting the upper crossbar to the lower crossbar at each of the upper crossbar and lower crossbar opposing ends.

12. The functional assembly of claim 1 wherein the operative unit comprises at least one of a gripping tool, a welding head, a staple head or an opto-electronic vision device.

13. A functional assembly for use with an industrial machine having an attachment flange, the functional assembly comprising:
   a support frame connected to the industrial machine attachment flange;
   an operative unit end effector connected to the support frame; and
   a safety cover connected to the support frame operable to selectively circumferentially cover the operative unit, the safety cover further comprising:
      a fixed portion having a circumferential wall fixedly connected to the support frame; and
      a movable portion movable relative to the fixed portion along a main direction, the movable portion including a circumferential wall positioned radially coaxially outside of the fixed portion, the movable portion having a lowered position thereby circumferentially covering the operative unit about the main direction and a raised position circumferentially exposing the operative unit, the movable portion circumferential wall defining a containment volume and a footprint, wherein the operative unit is operative to selectively move in a first auxiliary direction and a second auxiliary direction relative to the safety cover movable portion, the first and the second auxiliary directions are orthogonal to the other auxiliary direction and each are orthogonal to the main direction, the operative unit operable to selectively travel in at least one of the first or the second auxiliary directions outside of the movable portion circumferential wall footprint when the movable portion is in the raised position.

14. The functional assembly of claim 13 wherein the safety cover fixed portion circumferential wall and the movable portion circumferential wall further comprising a collaborative outer structure further comprising at least one of a proximity sensor or a contact sensor operable to detect the presence of an object adjacent the collaborative outer structure.

15. The functional assembly according to claim 14 further comprising an industrial machine including a controller in communication with the at least one of the proximity sensor or the contact sensor, wherein the controller is operable to at least one of decrease a speed of motion of the industrial machine or stop the speed of motion of the industrial machine on detection of a foreign body adjacent the safety cover.

16. The functional assembly of claim 15 wherein the industrial machine comprises a multi-axis robot.

17. The functional assembly of claim 13 further comprising:
   a first plate movably connected to the support frame, the first plate selectively movable relative to the support frame along the first auxiliary direction; and
   a second plate movably connected to the first plate, the second plate selectively movable relative to the first plate along the second auxiliary direction, wherein the operative unit is connected to the second plate.

18. The functional assembly of claim 13 further comprising:
   a first actuator connected to the support frame operable to selectively forcibly move the movable portion of the safety cover in the main direction relative to the fixed portion of the safety cover;
   an intermediate plate connected to the first actuator and the safety cover movable portion circumferential wall;
   a pair of guides connected to the support frame and oriented along the main direction; and
   a pair of side plates movably engaged with a respective one of the pair of guides, each side plate connected to the movable portion circumferential wall, wherein the actuator is operable to selectively move the movable portion along the main direction.

19. The functional assembly of claim 13 wherein the operative unit comprises at least one of a gripping tool, a welding head, a staple head or an opto-electronic vision device.

20. An operative unit end effector for use with an industrial robot having a robot wrist, the operative unit end effector comprising:
   a support frame operable to connect to the robot wrist;
   a first plate movably connected to the support frame;
   a first plate actuator connected to the support frame and the first plate, the first actuator operable to selectively move the first plate in a first auxiliary direction relative to the support frame;
   a second plate movably connected to the first plate;
   a second plate actuator connected to the support frame and the second plate, the second plate actuator operable to selectively move the second plate in a second auxiliary direction relative to the first plate, the second auxiliary direction orthogonal to the first auxiliary direction;
   an end effector tool connected to the second plate, the tool operable to selectively engage a workpiece; and
   a safety cover connected to the support frame operable to selectively circumferentially cover the tool, the safety cover further comprising:
      a fixed portion having a circumferential wall fixedly connected to the support frame; and a movable portion having a circumferential wall connected to the support frame and positioned circumferentially and coaxially relative to the fixed portion, the movable portion defining a footprint and internal containment volume, the movable portion selectively moveable from a raised position to a lowered position along a main direction relative to the fixed portion while remaining connected to the support frame, the main direction orthogonal to the first and the second auxiliary directions, wherein when the movable portion is positioned in the lowered position the movable portion circumferential wall circumferentially covers the tool about the main direction and in the raised position circumferentially uncovers at least a portion of the tool, wherein, when the movable portion is positioned in the raised position, the tool by selected movement of at least one of the first or second plate is operable to selectively move in a respective at least one of the first or the second auxiliary directions outside of the movable portion footprint; and a collaborative outer structure connected to at least one of the safety cover fixed or movable portions, the collaborative outer structure including at least one of a proximity or contact sensor in communication with a control system.

\* \* \* \* \*